July 2, 1963 L. MAYON ETAL 3,095,754
CONTROL APPARATUS
Filed June 30, 1960 2 Sheets-Sheet 1

INVENTORS.
LEON MAYON
DONALD P. SCHNORR
BY
Carl Fissell Jr.
AGENT

July 2, 1963  L. MAYON ETAL  3,095,754
CONTROL APPARATUS
Filed June 30, 1960  2 Sheets-Sheet 2

INVENTORS.
LEON MAYON
DONALD P. SCHNORR
BY
Carl Fissell Jr.
AGENT

United States Patent Office 3,095,754
Patented July 2, 1963

3,095,754
CONTROL APPARATUS
Leon Mayon, Philadelphia, and Donald P. Schnorr, Paoli, Pa., assignors to Burroughs Corporation, Detroit, Mich., a corporation of Michigan
Filed June 30, 1960, Ser. No. 40,007
3 Claims. (Cl. 74—471)

This invention relates to control apparatus and more particularly although not necessarily exclusively, to a return and centering device for a universally movable control handle or stick such as is used for the control or aircraft and the like.

In aircraft generally, the pilot's controls are connected to the control surfaces by means of mechanical linkages. The effect of the air upon the control surfaces is communicated back through the linkage effecting the ease of movement of the control stick as the pilot moves the controls. This manifestation of the control stick is called "feel." The pilot when in training learns to use this "feel" as part of his flying judgment.

The control surfaces of large supersonic aircraft due to their size, must be operated electrically or hydraulically so that the control mechanism may transmit signals to a separate operating means instead of being itself connected with the surfaces. Therefore, the "feel" of the control stick is missing. Several methods have been used to bring "feel" into the control stick but since each entails opposition to the pilot's movement and causes fatigue, they are not in general use.

Also in modern combat aircraft wherein ultra-high-supersonic speeds of operation are attained, airbourne computation gear is generally employed to "lock" the aircraft onto its target so that arming and firing of weapons is or may be accomplished automatically. Such apparatus is generally electronic in nature. Thus, it is necessary to provide an electrical output indication from the control stick apparatus for each of the X and Y axes of the control stick mechanism, as well as an electrical output for any intermediate position or condition in between the X and Y axes. Also, it is a requirement of such apparatus that the control element produce a positive and discrete output without "hunting" or "seeking," that is, wavering or overthrowing back and forth of the output producing mechanism between desired positions when the control apparatus is free to return to its so-called home position. In addition, the device must operate without producing pilot fatigue.

Prior control stick return and centering arrangements have used torsion or tension springs or rotary cams and spring biased levers to return the control stick to its zero or home position. These devices are unnecessarily cumbersome, provide high force angles, increasing the fatigue ratio, and generally lack the ability to produce a usable discrete output signal in the intermediate areas of a circularly movable control stick. They are relatively complicated and large in size and generally are erratic and unsmooth in operation. And, there is a continually increasing spring return force with increased displacement of the stick from its center position.

It is an object of the present invention to provide means for solving the foregoing problems in a simple and efficient manner.

Another object of the invention is to provide a control apparatus having a positive centering return force and zero position detent.

Another object of the invention is to provide control apparatus that includes readily interchangeable resilient elements thereby to provide a number of different return force patterns.

A still further object of the present invention is to provide control apparatus wherein essentially equal return forces can be produced for all angular positions of the control member.

In accordance with the foregoing objects and first briefly described herein, there is provided a gimbal mounted control member including means for producing an electrical outut indication of the position of the control member in all angular attitudes of displacement through a cone of movement the apex angle of which is 60° including a cam member carried by said apparatus and means movably engageable with the cam member for automatically biasing the control member to a rest or home position whenever the displacing force is removed therefrom.

These together with various ancillary features and objects of the invention which will later become apparent as the following description proceeds, are attained by the present invention, a preferred embodiment of which has been illustrated, by way of example only, in the accompanying drawings wherein.

Figure 1:
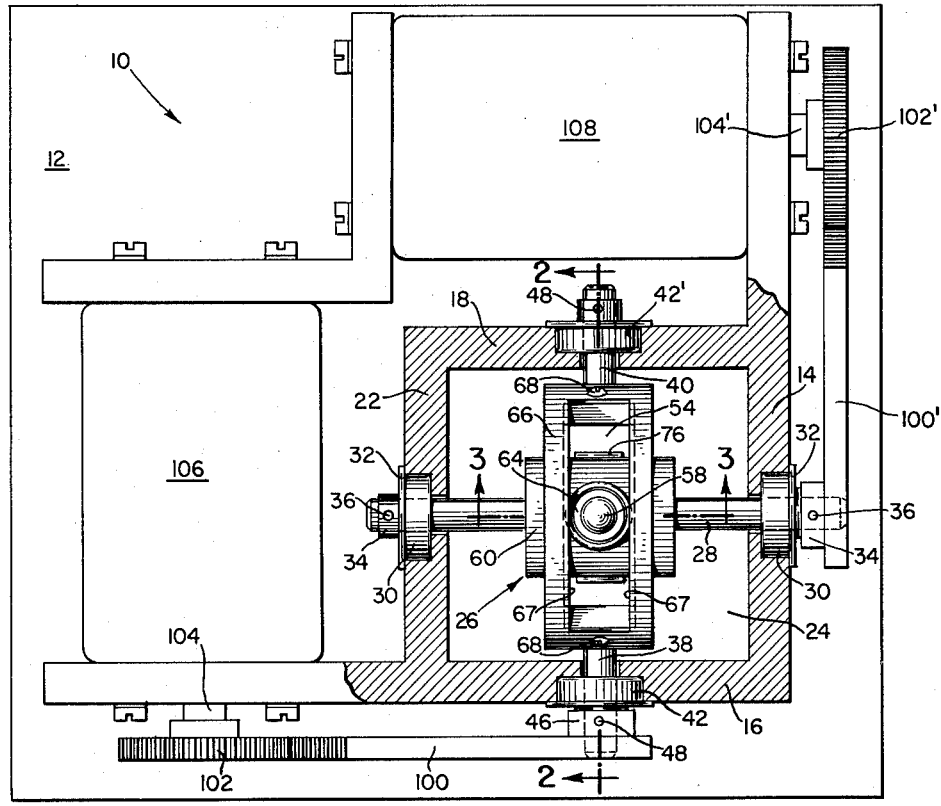
FIG. 1 is a plan view of the preferred embodiment of the invention with parts broken away to expose certain of the operating elements thereof.
Figure 6:
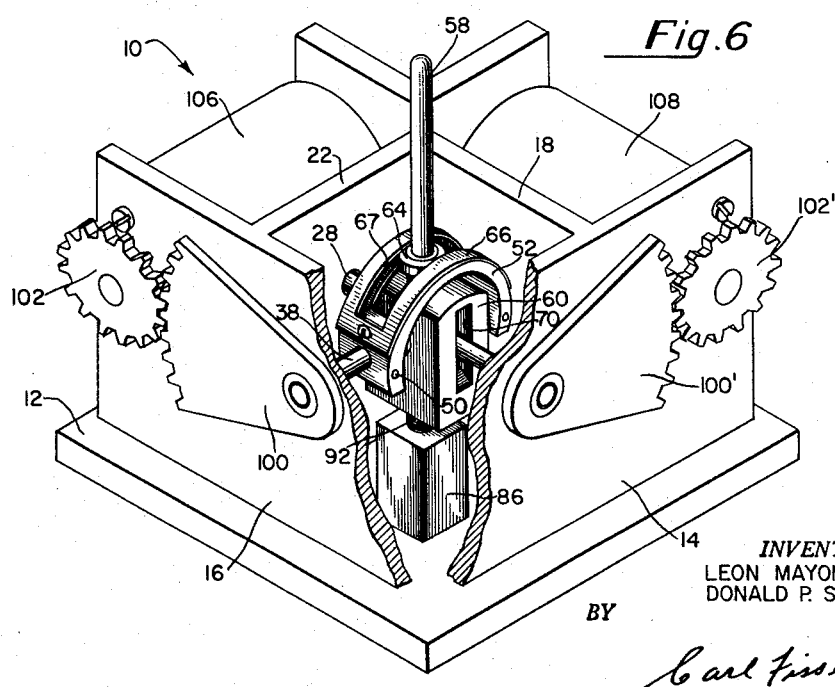
FIG. 6 is a perspective view of the assembled apparatus with parts broken away comprising the present invention.

Referring to FIGS. 1 and 6, which will be discussed simultaneously, there is shown a preferred form of control apparatus 10, embodying the present invention. This apparatus is mounted in conventional fashion upon a base 12 and includes a plurality of wall members 14, 16, 18 and 22 rising vertically from the base 12, together forming a rectangular chamber 24 within which the gimbal mounting 26 of the apparatus 10 is located. The mounting 26 includes an X axis shaft 28 which is journalled in opposite walls 14 and 22 by means of bearings 30—30' disposed at opposite ends of the shaft and secured against accidental loss or removal therefrom by means of washers 32 and collars 34—the latter being secured to the shaft 28 by means of dowels or pins 36. The Y axis members include oppositely disposed stub shafts 38 and 40 journalled for rotation in walls 16 and 18 respectively, by means of the bearings 42 and 42' which are secured against accidental removal or displacement therefrom by means of the collars 46 and dowels or pins 48.

Figure 2:
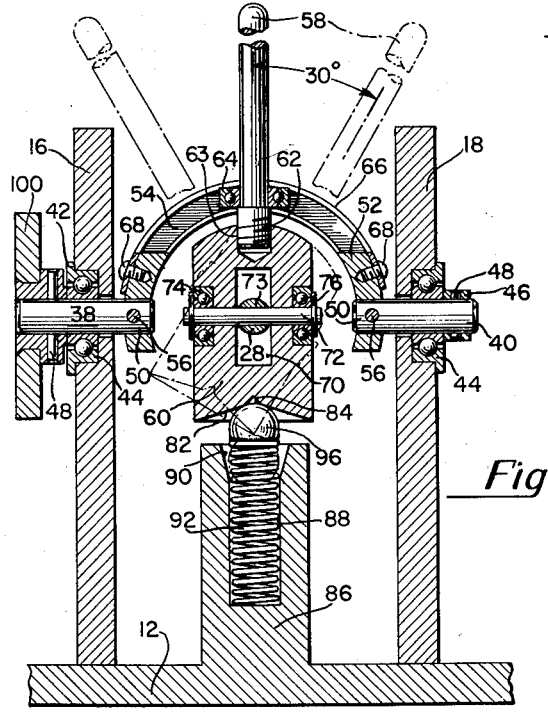
FIG. 2 is a sectional view along the line 2—2 of FIG. 1.
Figure 3:
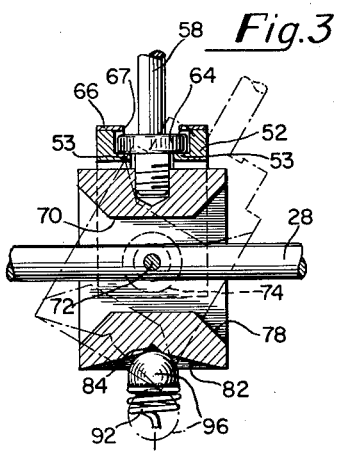
FIG. 3 is a sectional view along the line 3—3 of FIG. 1.

Disposed intermediate the inner confronting ends 50, FIG. 2, of the shafts 38 and 40 and spanning the space therebetween is a semi-circular member 52 provided with parallel flanges 53—53, FIG. 3, and having an elongated arcuate opening or slot 54 therethrough, extending around its circumference. Member 52 is attached to the ends 50 of the shafts 38 and 40 as by pins or dowels 56 in a conventional manner.

A control element 58, which in the present preferred embodiment takes the shape of an elongated cylindrical rod or stick, is secured to a gimbal block 60 by means of a threaded portion 62 which is screwed into a threaded opening 63 in the block 60. A bearing member 64, press fitted to the control element adjustment the threaded end thereof, is mounted for arcuate movement within a raceway provided by the flanges 53—53 and a slotted radial retainer shield 66, the inner parallel edges 67 of which overlap the bearing slightly, FIGS. 1, 3 and 5. The shield is secured at opposite ends thereof to the member 52 as by screws 68. The stick thus can move in an arcuate path from side to side of the member 52 in an arc approximately 60° wide.

The block 60 is provided with a transverse slot 70 extending completely therethrough and into and through which the X axis shaft 28 projects. Shaft 28 is rotatably attached to the block by means of a short cross shaft 72 extending horizontally at right angles thereto, and which is received through an opening 73 in shaft 28. Shaft 72 is rotatably mounted within the block by means of bearings 74 secured at opposite ends of the shaft, as by C rings 76. The slot through the block is angularly cut away or opened out at opposite ends thereof in a funnel-like configuration, FIGS. 3, 5 and 6, for clearance purposes, in order to prevent the X axis shaft from interfering with the travel of the block in its extreme lateral positions of movement as it is tilted from side to side. The lower surface portion 78 of the gimbal block 60 is angularly configured and shaped to provide a cam surface in the form of a conical depression 82 in the end of the block. The center of the depression 82 may be provided with a small opening or recess 84 (FIG. 5) for purposes which will become more fully apparent hereinafter.

Disposed on the base member 12 beneath the block 60, as seen most clearly in FIGS. 2 and 6, and projecting vertically upwardly therefrom toward block 60 is a pedestal-like member 86 having an elongated cylindrical opening 88 extending throughout a major portion of its vertical extent. The upper end 90 of the opening is flared slightly, FIG. 2, and is adapted to slidably contain a coiled spring 92 therein. Secured to the upper exposed end 94 of the coiled spring 92 is a spherical member, such as a ball bearing 96, which may be attached to the spring in any convenient manner as by welding or soldering depending upon the combination of materials involved or by being pressed within the terminal coils thereof. The spring 92 is sufficiently resilient to normally press the ball 96 against the angular cam surface of depression 82 in the base of the block 60. The combination of spring tension and the clearance between the spring and the wall of the cylindrical opening in the pedestal is such as to permit the ball 96 to move vertically up and down therein.

In the operation of the apparatus when the control element 58 is moved from right to left about the Y axis, for example, FIG. 2, the ball 96 will be depressed within the aperture 88 against the tension of the spring 92, more or less, depending upon the angular relation of the cam surface 82 with respect to the ball, see broken line showing in FIG. 3. When the control member is released, the pressure of the spring as a result of its vertical travel, will force the block 60 by cam action to return to its rest or home position, which is the center, full line position FIG. 2. The stick return or homing forces are made to be variable by varying the tensile strength and/or resilience of the spring 92. The spring force exerted against the centering gimbal may, by changing the contour of the cam 82, also be varied, thus changing the cam angle. The contour of the surface 82 may be spherical.

The apparatus embodying the present invention finds use, for example, with computation apparatus to which it will be operably coupled and wherein means may be provided for converting the essentially mechanical movements or positions of the gimbal mounting to an electrical output which is capable of producing a signal or indication representative of such mechanical movement e.g., the active physical position of the control member relative to the home or rest position of the apparatus. Apparatus of the latter type known as analog to digital conversion, is shown and described in "Digital Techniques for Computation and Control," copyright 1958, by Kline, Morgan and Aronsen, Instrumental Publishing Company, Pittsburgh 12, Pennsylvania, pages 164 and 165.

One such construction utilizes the foregoing arrangement as set forth in FIG. 6 wherein the output end of the X axis shaft 28 and the Y axis shaft 38 respectively, is provided with a sector gear 100—100' each of which is disposed in mesh with a respective drive pinion 102—102' disposed on the outer end of the shaft 104—104' of individual analog to digital converter members 106—108. These devices may be used to produce an electrical output from a mechanical input. The input in this case being analog in nature, while the output is digital in nature. The outputs may be used, in the present instance, to provide input information for computation apparatus, not shown, which is in or may be used, for example, for fire control in a combat aircraft in which the present control apparatus may be employed.

Figure 5:
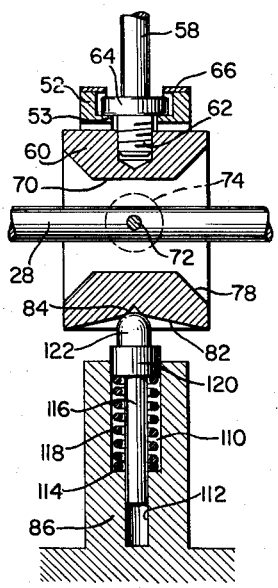
FIG. 5 is a sectional view of a modified centering and return mechanism for the present invention.

In FIG. 5 there is shown a modified form of centering and return apparatus of the present invention. The pedestal 86 which as before mentioned, may be secured to the base, for example, as by being fabricated integral therewith, is provided with a pair of concentric cylindrical openings or bores 110 and 112 separated by shoulder or ledge portion 114. The shank of a plunger 116 is slidably receivable within the lower cylindrical opening 112 and is biased outwardly therefrom by means of a coiled spring 118 one end of which is adapted to seat against the shoulder 114 while the other end thereof abuts an enlarged collar 120 at the other end of the plunger slidably received within opening 110. The rounded or hemispherical tip 122 of the plunger 116 is urged against the bottom of the block 60 to ride along the cam surface 82 thereof in substantially the same fashion as the ball 96 moves with respect to the cam surface of the block 60, as seen in FIGS. 2 and 3.

Similarly, as with the earlier described apparatus, movement of the control element 58 will deflect the block 60 causing the centering plunger 116 to move vertically upwardly and downwardly within the cylindrical openings in the pedestal 86 against the tension of the spring 118. As the control stick is moved to a point furtherest removed from the mid point of the centering cam, the plunger 116 will be well within the bore of the opening in the pedestal. When the stick is in its neutral position the plunger is disposed immediately under the notch or depression 82 cut in the base of the cam, FIG. 5 which serves to positively detent it in its neutral position.

It should be clear from what has been disclosed herein that when the control stick is moved from its home position, full line in FIGS. 2, 3, and 5, to any other position, the camming action between the surface 80 and the ball 96 causes the spring to compress into the pedestal housing. When the applied forces on the stick are released, the gimbal block 60 is returned by spring pressure to the original position. The small hole or recess 84 drilled, milled or otherwise formed in the base of the cam surface acts as a detent causing the ball 96 to "snap" into place when it is near the center or home location.

Figure 4:
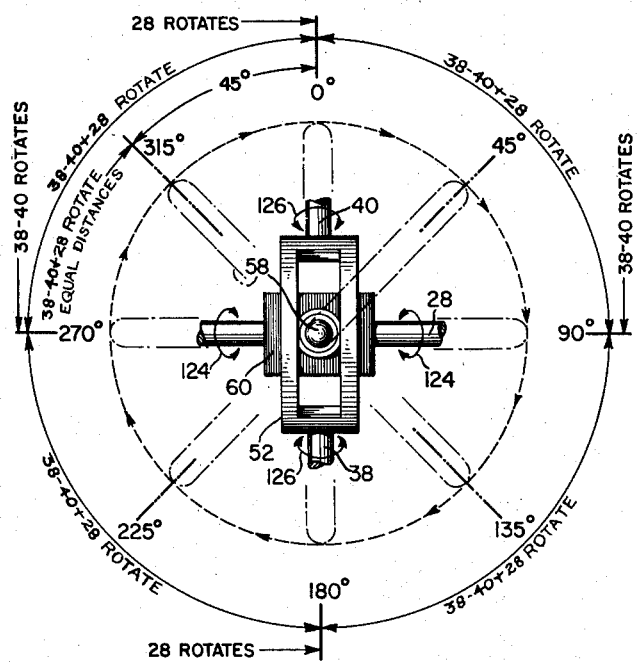
FIG. 4 is a motion diagram illustrating various operational attitudes of the invention.

Referring to FIG. 4, which is a diagrammatic illustration of some of the various positions of the control element of the present apparatus, it can be seen that when the control element 58 is rotated about the axis of shaft 28 and at right angles to shaft 28, in the direction of arrows 124, only shaft 28 will rotate. Conversely, if the stick 58 is moved to the left or right angularly of shafts 38 and 40 at right angles to shafts 38 and 40" in the direction of arrows 126, only shafts 38 and 40 will rotate. Movement of the control element 58 at a 45° angle—dotted outline between any one of the horizontal or vertical shaft positions—causes both X and Y axes shafts 28, 38 and 40 within that particular quadrant to rotate equal distances. For each movement of the control element within any quadrant of less than 45°, say from 45° to 90° for example, shaft 28 of the X axis and shafts 38 and 40 of the Y axis will move varying amounts, more or less, depending upon whether or not the control member is moved toward or away from the vertical or horizontal axes, as seen in FIG. 4.

The foregoing novel construction permits the control element to be automatically returned to its rest or home position without wavering, wobbling, "hunting" or "seeking" thus providing an accurate output indication of its physical attitude with respect to the remainder of the apparatus.

What is claimed is:

1. Control apparatus comprising, in combination,
   (a) first rotatable shaft means,
   (b) second rotatable shaft means,
   (c) said two shaft means being arranged to rotate about mutually perpendicular intersecting, longitudinal shaft axes,
   (d) first gimbal means fixedly connected to said first shaft means,
   (e) second gimbal means connected to said second shaft means,
   (f) said first gimbal means including a semi-circular portion having an arcuate slot therein,
   (g) said second gimbal means being provided with two substantially perpendicularly disposed openings therein,
   (h) means rotatably mounting said second shaft means in one of said openings in said second gimbal means,
   (i) a control element extending through the arcuate slot in said semi-circular portion,
   (j) bearing means mounting said control element for slidable arcuate movement in said slot,
   (k) said control element being rigidly fixed to one end of said second gimbal means and being effective to move the latter in response to forces applied to said control element,
   (l) the opposite end of said second gimbal means having a conical depression forming a cam surface therein, and
   (m) means mounting a coiled spring adjacent said second gimbal means,
   (n) said coil spring carrying a spherical member at one end thereof engaging said cam surface whereby the forces developed by said spring causes said spherical member to constantly urge said control element into a position wherein it is perpendicular to both said shaft means.

2. Control apparatus comprising, in combination,
   (a) first rotatable shaft means,
   (b) second rotatable shaft means,
   (c) said two shaft means being arranged to rotate about mutually perpendicular intersecting, longitudinal shaft axes,
   (d) first gimbal means fixedly connected to said first shaft means,
   (e) second gimbal means connected to said second shaft means,
   (f) said first gimbal means including a semi-circular portion having an arcuate slot therein,
   (g) said second gimbal means including a rectangular portion having two substantially perpendicularly disposed openings therein,
   (h) means rotatably mounting said second shaft means in one of said openings in said second gimbal means,
   (i) a control element extending through the arcuate slot in said semi-circular portion,
   (j) bearing means mounting said control element for slidable arcuate movement in said slot,
   (k) said control element being rigidly fixed to one end of said rectangular portion and effective to move the latter in response to forces applied to said control element,
   (l) the opposite end of said rectangular portion having a spherical depression forming a cam surface therein,
   (m) a supporting pedestal mounted adjacent the said one end of said rectangular portion and being provided with an axial bore therein,
   (n) a plunger having an exposed spherical end portion slidably disposed in the bore of said pedestal and slightly therebeyond, and,
   (o) a coiled spring biasing said spherical portion of said plunger into engagement with said cam surface whereby the force developed by said spring causes said spherical portion to constantly urge said control element into a position wherein it is perpendicular to both said shaft means.

3. Control apparatus comprising, in combination,
   (a) first rotatable shaft means,
   (b) second rotatable shaft means,
   (c) said two shaft means being arranged to rotate about mutually perpendicular intersecting, longitudinal shaft axes,
   (d) first gimbal means fixedly connected to said first shaft means and including a semi-circular portion having an arcuate slot therein,
   (e) a second gimbal means having two substantially perpendicularly disposed openings therein,
   (f) means rotatably mounting said second shaft means in one of said openings,
   (g) a control element extending through the arcuate slot in said semi-circular portion,
   (h) bearing means for said control element effecting slidable arcuate movement of said control element in said slot,
   (i) arcuate means restraining said bearing means within the slot of said semi-circular portion,
   (j) said control element being rigidly fixed to one end of said second gimbal means effective to move the latter in response to forces applied to said control element,
   (k) the opposite end of said second gimbal means having a conical shaped depression forming a cam surface therein,
   (l) said depression terminating at its apex in a V-shaped notch,
   (m) an elongated vertically disposed pedestal mounted adjacent one end of said second gimbal means and provided with an axial bore therein the upper end of which is flared outwardly slightly, and
   (n) a coil spring disposed in the bore of said pedestal and adapted to project slightly beyond said bore and carrying at one end thereof a spherical member engaging said cam surface whereby said spring and said spherical member constantly urge said control element into said notch whereby said control element is positively detented in a position perpendicular to both said shaft means.

References Cited in the file of this patent

UNITED STATES PATENTS

| | | |
|---|---|---|
| 1,418,693 | Bauer | June 6, 1922 |
| 1,526,905 | Eckels | Feb. 17, 1925 |
| 1,829,037 | Bobroff | Oct. 27, 1931 |
| 1,923,290 | Wood | Aug. 22, 1933 |
| 2,206,474 | Bowers et al. | July 2, 1940 |
| 2,379,778 | Allen | July 3, 1945 |
| 2,929,258 | Mackway | Mar. 22, 1960 |
| 2,954,707 | Kalous | Oct. 4, 1960 |
| 2,964,964 | Craig | Dec. 20, 1960 |

FOREIGN PATENTS

| | | |
|---|---|---|
| 142,500 | Sweden | Oct. 13, 1953 |
| 531,423 | Great Britain | Jan. 3, 1941 |